United States Patent
Chi

(10) Patent No.: US 7,403,572 B2
(45) Date of Patent: Jul. 22, 2008

(54) METHOD OF PREVENTING INTERFERRING SIGNAL TRANSMISSION OF ELECTRONIC PRODUCTS

(75) Inventor: Chung-Ping Chi, Chung Ho (TW)

(73) Assignee: Topseed Technology Corp., Taipei (TW)

( * ) Notice: Subject to any disclaimer, the term of this patent is extended or adjusted under 35 U.S.C. 154(b) by 822 days.

(21) Appl. No.: 10/978,447

(22) Filed: Nov. 2, 2004

(65) Prior Publication Data

US 2006/0093063 A1 May 4, 2006

(51) Int. Cl.
*H04K 1/02* (2006.01)
*H04L 25/03* (2006.01)
*H04L 25/49* (2006.01)

(52) U.S. Cl. .................. 375/296; 340/572.2
(58) Field of Classification Search .......... 375/296; 340/572.2
See application file for complete search history.

(56) References Cited

U.S. PATENT DOCUMENTS 5,604,732 A * 2/1997 Kim et al. .............. 370/342
6,516,467 B1 * 2/2003 Schindler et al. ........ 725/153
2005/0114690 A1 * 5/2005 Rodriguez et al. ...... 713/200

* cited by examiner

Primary Examiner—Curtis B Odom

(57) ABSTRACT

A method of preventing interference of signals transmitted from electronic input devices to a computer host. An identification is generated for each individual electronic device. A receiving unit is connected to the computer host. The identification frequencies are pre-stored in the receiving unit. The receiving unit performs scanning of signals transmitted from the electronic devices with a scanning cycle. The receiving unit switches between a plurality of detection sequences within each scanning cycle. When signals are transmitted from the electronic devices, the receiving unit receives the signals within the detection sequences corresponding to the electronic devices that transmitting the signals. The identification frequencies carried by the signals are compared to the pre-stored identification frequencies to ensure the signals being received at respective frequency channels. The input data carried by the signals can thus be received and transmitted the input data to the computer host without being interfered. In one embodiment, each of the identification frequencies is modulated with a product identification code, a sub-identification code and the input data.

9 Claims, 3 Drawing Sheets

METHOD OF PREVENTING INTERFERRING SIGNAL TRANSMISSION OF ELECTRONIC PRODUCTS

BACKGROUND OF THE INVENTION

The present invention relates in general to a method of preventing interfering signal transmission of an electronic product, and more particularly, to a method that prevent interference and overcome the problem of identification between signals simultaneously transmitted from electronic products by generating a unit identification frequency for each individual electronic device.

In the application of computers and the peripherals thereof, the limitation of cost and space often results in the connection of a single computer host and electronic input devices such as multiple mouse, keyboards, remote controls and audio input devices. Or for the multimedia function, a mouse, a keyboard, a remote control and an audio input device are often required and connected to the same computer. The conventional signal transmission between the computer host and the electronic input devices is performed by a switch which serves as a signal transmission medium. The hardwire connection has the limitation of the length of cables. Further, when many electronic devices are connected, the cables are easily tangled together to cause difficulty in maintenance. In addition, when the cables are worn off by mouse bite or other external forces, the connection is seriously affected.

The wireless transmission technologies such as radio-frequency (RF) transmission, the WLAN local network operative to perform bi-directional signal transmission for multiple frequency channels and the Bluetooth wireless technique have been applied to electronic products such as mouse, keyboard, remote control, and audio input devices (such as wireless microphone). The WLAN local network and Bluetooth wireless techniques both adapt the frequency of 2.4 GHz as the signal transmission frequency standard. The bidirectional operation frequency is often set up between 2420 MHz and 2460 MHz. That is, only 40 MHz operation bandwidth is provided for bi-directional signal transmission. Therefore, it is easy to cause interference between signals, such that the computer cannot properly receive the input signal or correctly determine the signal source.

BRIEF SUMMARY OF THE INVENTION

To resolve the above drawbacks, a method of preventing interference of signals transmitted from electronic input devices to a computer host is provided. An identification is generated for each individual electronic device. A receiving unit is connected to the computer host. The identification frequencies are pre-stored in the receiving unit. The receiving unit performs scanning of signals transmitted from the electronic devices with a scanning cycle. The receiving unit switches between a plurality of detection sequences within each scanning cycle. When signals are transmitted from the electronic devices, the receiving unit receives the signals within the detection sequences corresponding to the electronic devices that transmitting the signals. The identification frequencies carried by the signals are compared to the pre-stored identification frequencies to ensure the signals being received at respective frequency channels. The input data carried by the signals can thus be received and transmitted the input data to the computer host without being interfered. In one embodiment, each of the identification frequencies is modulated with a product identification code, a sub-identification code and the input data.

A device for preventing interference signals transmitted from electronic devices to a computer host is also provided. The device includes a plurality of identification generators built in respective ones of the electronic devices and a receiving unit connected to the computer host. Each of the identification generators is operative to generate a unique identification frequency. The receiving unit is operative to receive signals transmitted form the electronic devices according to the identification frequencies thereof.

BRIEF DESCRIPTION OF THE DRAWINGS

The above objects and advantages of the present invention will be become more apparent by describing in detail exemplary embodiments thereof with reference to the attached drawings in which.

DETAILED DESCRIPTION OF THE INVENTION

Figure 1:
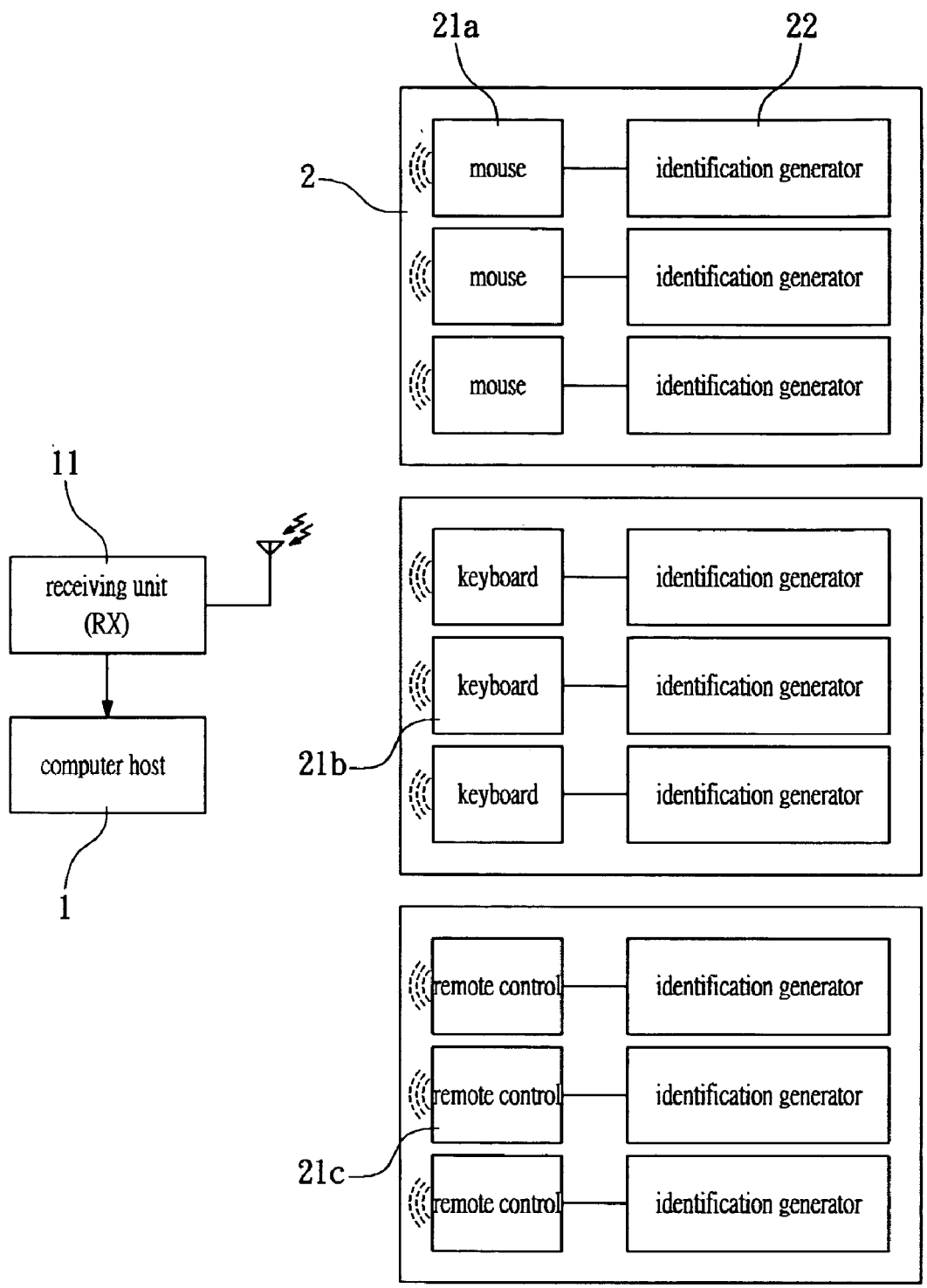
FIG. 1 shows an embodiment of signal transceiving structure.

Referring to FIG. 1, the structure of a signal transmission as illustrated comprises a receiving unit 1 connected to a computer host 1 and various electronic input products 2 operative to transmit wireless signals. The electronic products 2 include mouse 21a, keyboards 21b, remote controls 21c and audio input devices, for example. The system allows multiple users to transmit signals carrying data or command to the computer host at the same time by operating the electronic input devices 2.

A unique identification frequency is independently generated for each individual electronic product 2, such that the signal composed of input data or command can be transmitted with the specific identification frequency. The method of generating individual identification frequency includes installing an identification generator 22 in each electronic product 2. When the user press or operate the electronic product 2, the individual identification frequency is generated by fuzzy. The generated identification frequency is received and stored by the receiving unit 11 for future identification of an incoming signal.

Figure 2:
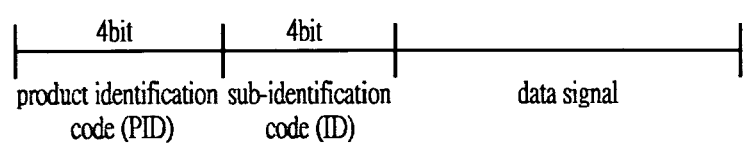
FIG. 2 shows the composition of an identification frequency of an electronic product.

The signal identification frequency includes product identification codes (PID) and sub-identification code (ID) for receiving a sequence of signals composed of electronically operated input data and command. As shown in FIG. 2, the product identification codes are used to identify a specific type of products. Therefore, a batch of products such as mouse 21a produced from the same factory may have the common product identification code. As mentioned, the sub-identification code is individually generated by the identification frequency generator 22 built in the specific electronic product 2. Therefore, the sub-identification code can be used to identify the same type of electronic products 2. The product identification code and the sub-identification code are composed of several bits such as 4 bits, 5 bits, 6 bits or other number of bits. Thereby, a number such as 24, 25, 26 of sequence codes may be generated to provide one product identification code and one sub-identification code for each individual electronic product 2. The product identification code and the sub-identification code results in a unique frequency for the signal transmitted from each individual electronic input device 2.

The receiving unit 11 includes a RF transceiving terminal to one-directionally receive the input data and commands transmitted from multiple electronic input devices 2 individually or simultaneously. According to a predetermined scanning period, the detection sequence is continuously switched for performing signal detection and reception.

Figure 3:
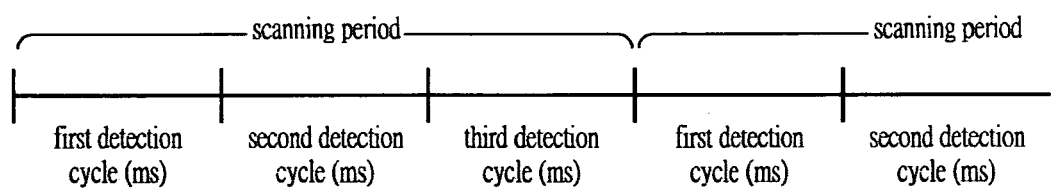
FIG. 3 shows the scanning cycle and the detection sequence within each scanning cycle.

As mentioned, receiving unit 11 receives and detects signals with a scanning cycle. Preferably, the scanning cycle is determined by a software program. For example, 20 ms may be set up as one detection cycle. It will be appreciated that the detection cycle is not limited to 20 ms. The detection is iterated and switched between the frequency sequences. As shown in FIG. 3, there are three detection sequences in one detection cycle. Each of the detection sequences corresponds to one type of electronic products 2. For example, the first detection sequence is designed for receiving signals transmitted from the mouse 21a, the second detection sequence is designed for receiving signals generated from the keyboards 21b, and the third sequence is designed for receiving signals emitted from the remote controls 21c. More specifically, one detection sequence is for receiving one type of electronic products 2 only. Within the specific detection sequence, reception of other type of electronic products will not be performed. In addition, in the specific detection sequence, multiple signals (for example, 8 signals) transmitted from multiple this type of electronic products 2 can be detected. In practical application, switching speed between the detection sequences is as fast as about 1 microsecond. The receiving unit 11 can compare the frequency of the actual received signals with the frequency pre-stored therein to avoid interference of the signals.

Figure 4:
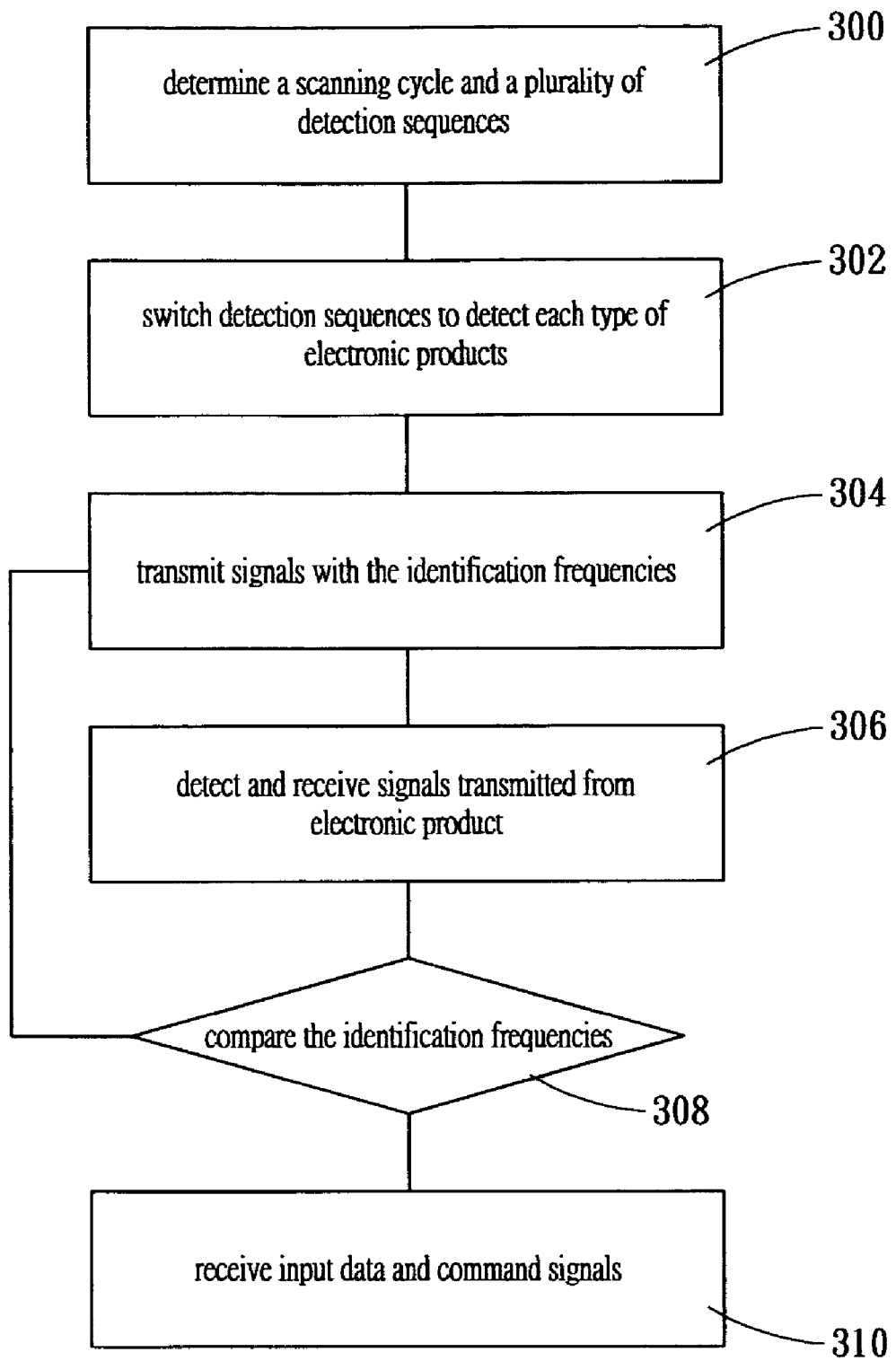
FIG. 4 shows the process flow of a method for detecting and identifying a signal.

FIG. 4 illustrates a process flow for signal detection, receiving and identification performed by the electronic products as discussed above.

Firstly, an identification frequency is independently generated for each individual electronic product 2 by the identification frequency generator 22 thereof. The identification frequency is received and stored in the receiving unit 11.

In step 300, a scanning cycle and a plurality of detection sequences within the scanning cycle are determined by a software program. Each of the detection sequences corresponds to one type of the electronic products 2.

In step 302, the receiving unit 11 automatically switches between the detection sequences to detect each type of electronic products according to the predetermined signal scanning cycle.

In step 304, the electronic products 2 transmit signals with the identification frequencies corresponding to specific signal sequences and the input data and command.

In step 306, the receiving unit 11 detects and receives a sequence or multiple sequences of signals transmitted from the electronic product within a detection sequence.

In step 308, the receiving unit 12 compares the identification frequencies stored therein to the identification frequency of the sequence of signals transmitted from the electronic products.

In step 310, the input data and command signals transmitted from each electronic product are received in a specific frequency.

By the method of detecting, receiving and identifying signals transmitted from the electronic products, the receiving units 11 can switch the independent frequency channels for receiving the signals, such that signals transmitted from different electronic products will not be received in the same frequency channel, and the interference of the received signal can be prevented.

While the present invention has been particularly shown and described with reference to preferred embodiments thereof, it will be understood by those of ordinary skill in the art the various changes in form and details may be made therein without departing from the spirit and scope of the present invention as defined by the appended claims.

What is claimed is:

1. A method of preventing interfering signals transmitted from electronic input devices, comprising:
   generating one wireless identification frequency for each electronic input device;
   receiving and storing the wireless identification frequencies within a receiving unit connected to a host;
   performing scanning with a predetermine scanning cycle, wherein the receiving unit automatically switching between a plurality of detection sequences corresponding to respective types of the electronic input devices; and
   the receiving unit comparing identification frequencies of signals transmitted from the electronic input devices to the stored identification frequencies and detecting an receiving the signals at the identification frequencies thereof
   wherein each identification frequency includes a product identification code, a sub-identification code and an input data and commands of the electronic input device.

2. The method of claim 1, further comprising providing a software program to determine the scanning cycle.

3. The method of claim 1, further comprising receiving multiple signals transmitted from each electronic product within the corresponding detection sequence.

4. The method of claim 1, further comprising installing an identification frequency generator in each electronic product.

5. The method of claim 4, further comprising generating the identification frequencies by the identification generators.

6. The method of claim 1, wherein the product identification code provides information of the type of the electronic input device.

7. The method of claim 1, wherein the sub-identification code provides identification information for each individual electronic input device of the same type.

8. The method of claim 1, wherein the electronic input device includes mouses, keyboards, remote controls and audio input devices.

9. A method of preventing interfering signals transmitted from electronic input devices to a computer host, comprising:
   generating an identification frequency for each individual electronic device;
   providing a receiving unit connected to the computer host;
   pre-storing the identification frequencies in the receiving unit;
   performing scanning by the receiving unit with a scanning cycle;
   switching between a plurality of detection sequences within each scanning cycle;
   transmitting signals from the electronic devices;
   receiving the signals by the receiving unit within the detection sequences corresponding to the electronic devices that transmitting the signals;
   comparing identification frequencies carried by the signals to the pre-stored identification frequencies; and
   receiving input data carried by the signals and transmit the input data to the computer host
   wherein each of the identification frequencies are modulated with a product identification code, a sub-identification code and the input data.

* * * * *